UNITED STATES PATENT OFFICE.

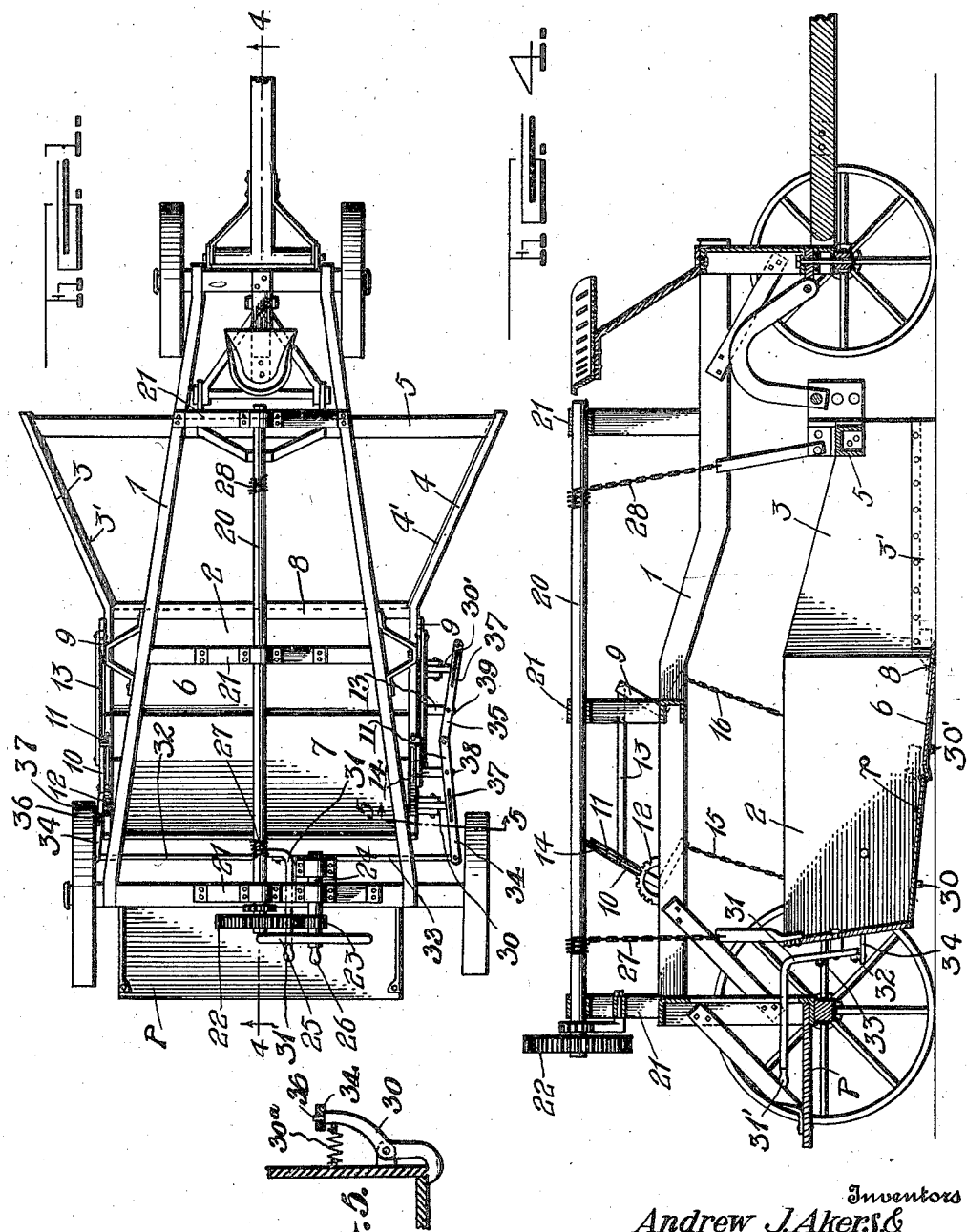

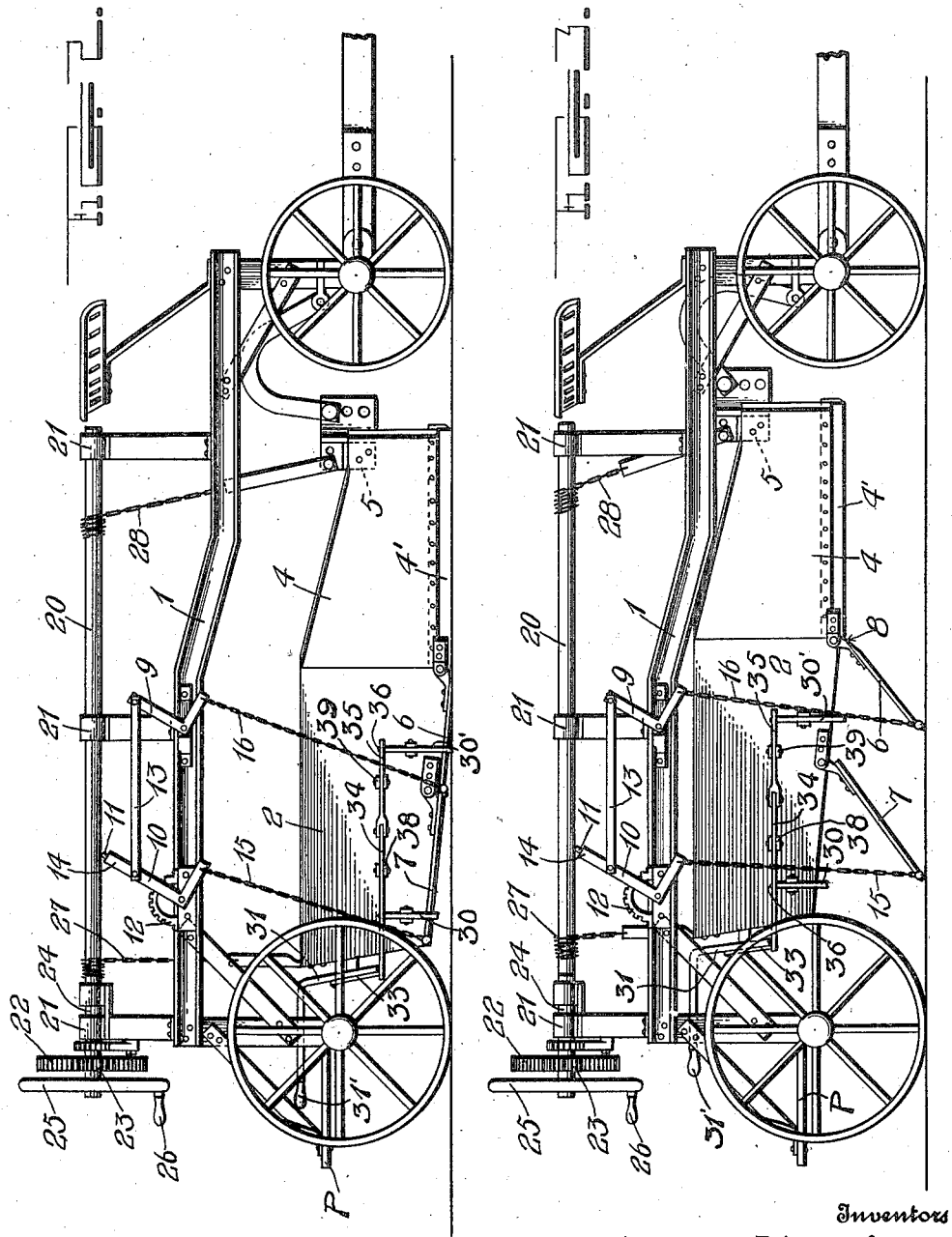

ANDREW J. AKERS AND EMMETT E. AKERS, OF CLAYTON, ILLINOIS.

ROAD-GRADER.

1,186,725.  Specification of Letters Patent.  Patented June 13, 1916.

Application filed January 4, 1915. Serial No. 433.

*To all whom it may concern:*

Be it known that we, ANDREW J. AKERS and EMMETT E. AKERS, citizens of the United States, residing at Clayton, in the county of Adams and State of Illinois, have invented certain new and useful Improvements in Road-Graders; and we do declare the following to be a full, clear, and exact description of the invention, such as will enable other skilled in the art to which it appertains to make and use the same.

This invention relates to improvements in road graders.

The main object of the invention is to provide a simply constructed and efficient machine for simultaneously excavating and grading and which may also be used for digging ditches and trenches and for conveying the excavated earth to a distant point.

Another object is to provide a machine of this character having dumping plates or shutters equipped with improved means for raising and lowering the shutters, and with means for fastening the shutters in closed position.

With these and other objects in view, the invention consists of certain novel features of construction, and the combination and arrangement of parts as will be more fully described and claimed.

In the accompanying drawings: Figure 1 represents a plane view of a road grader constructed in accordance with this invention; Fig. 2 is a side elevation thereof, showing the machine in operative position for scraping a road; Fig. 3 is a similar view with the parts in raised dumping position; Fig. 4 is a longitudinal vertical section thereof.

In the embodiment illustrated, a supporting longitudinally extending frame 1 is shown mounted on wheels and having a scoop with a substantially rectangular body portion 2, provided with diverging dirt cutting and gathering side arms or members 3 and 4 at its front end. These side members are connected at their free ends by a cross bar 5 and have cutting or scraping blades 3' and 4' arranged at their lower edges. The bottom of the rectangular portion of this scoop is formed of two hingedly mounted sections in the form of shutters or dumping plates 6 and 7, the two front corners of each of which are hinged to the sides of the scoop; the rear corners of said shutters being attached to the frame by flexible elements 15 and 16, which prevent the shutters from dragging on the ground.

The front edge of the front shutter 6 is equipped with a cutting blade 8 and being connected with the side members of the scoop may by the elevation of the scoop be raised sufficiently to discontinue the cutting and clear the ground. These shutters may be tilted or raised at their front ends when the scoop is raised and the earth which said shutters support and which has been scooped into the body of the scoop during the travel of the machine, by said blades 3 and 4, and the blade 8 on the front shutter, will be allowed to run out at the rear and be distributed along the road bed. When the point is reached where the dirt is to be dumped, the same is accomplished by operating shaft 20, raising the scoop and elevating the front edges of the shutters, leaving the rear of the shutters in lowered position, thus producing openings through which the dirt escapes. Fulcrumed on the opposite side members of the frame 1, are longitudinally spaced bell cranks 9 and 10, those on one side member being arranged opposite those on the other. One arm of each rear bell crank is provided with a dog 11, adapted to engage an arcuate rack 12 for locking the levers in adjusted position.

A link 13 connects the rear arms of the bell cranks 9 and 10 at each side of machine, and thus provides for the simultaneous actuation of these bell cranks for a purpose to be described. The rear arm of the rear bell crank 10 is preferably extended to form an operating handle 14. Connected with the free end of each of the forwardly extending arms of the two bell cranks 9 and 10 are flexible elements 15 and 16, here shown in the form of chains, and these elements are connected at their other ends with the free rear ends of the shutters 6 and 7, and are designed for raising and lowering the shutters and for locking them in adjusted position by means of the dog and rack above described, it being obvious that when one of said bell cranks is actuated, the other will also be actuated by means of the link connection 13, and hence the two shutters are simultaneously opened or closed as desired.

A longitudinally disposed shaft 20 is mounted in uprights 21, carried by the frame 1, and here shown disposed midway the width of the machine. A gear 22 is fixed to one end of said shaft 20, being shown here connected to the rear end, and said gear 22 meshes with another gear 23 carried by a stud shaft 24, also mounted on the frame 1, at one side of the shaft 20 and preferably in the same horizontal plane. A hand wheel 25 is also fixed to the shaft 24 and is provided with an operating handle 26 for turning the gear 23 and through said gear, the gear 22 with which it meshes, imparting motion to the shaft 20 for a purpose to be described. Flexible elements 27 and 28 are connected at one end to said shaft 20 preferably near opposite ends thereof, and said elements are connected at their other ends with the front and rear respectively of the body portion of the scoop, so that when said shaft 20 is turned in one direction, these elements 27 and 28 will be wound up thereon, and thus raise the body or scoop of the machine into the position shown in Fig. 3 and this raising of the body portion permits the shutters 6 and 7 at the bottom thereof, to open and thus permit the earth scooped up by the machine to be dumped or distributed over the road bed.

When it is desired to use the machine for conveying the scooped up earth free of the ground to a suitable place of deposit, dogs 30 mounted on the side members of the scoop are engaged with the rear corners of the shutters and hold them closed and thus hold the earth within the machine until it is desired to dump it. After the machine has been conducted to a place of deposit, the dogs 30 are released from the shutters and dogs 11 released from racks 12 and the bell cranks under the weight of the shutters will rock forwardly on their fulcrums, and thus permit the shutters to drop down under the weight of the load and release the contents of the machine. When the load has been dumped, the shutters may be closed again by grasping the handles 14 of the rear bell cranks and moving them rearwardly whereby the front arms of said levers are lifted, thereby lifting the free ends of the shutters connected therewith into closed position. After the parts have been so disposed, the dogs on the rear bell cranks are engaged with the racks 12 and the dogs 30 with the shutters which latter will be held in closed position until again released.

In the operation of this machine, the parts being disposed in the position shown in Fig. 2 the cutting blades 3' and 4' and the cutting blade 8 on the front shutter 6 disposed in position for contact with the surface to be graded, motion is imparted to the machine by any suitable means for causing it to move forward, draft mechanism being shown for the attachment of horses, but it is obvious that it may be motor propelled if desired. During this forward movement of the machine over the surface to be graded, the cutting blades of the sides 3 and 4 and at the edge of the front shutter, cut or excavate the earth and push or drag it into the scoop 2 and pass it back into the body of the scoop and rear ends of the shutters having been suitably adjusted, and the desired quantity having been scooped into scoop 2, it may be dumped by raising the front end of the scoop in the manner above described.

The spring pressed dogs 30 and 30' mounted on the sides of the scoop for locking the shutters in closed position may be released by any suitable means, a lever 31 being here shown fulcrumed intermediately of its ends at the rear of the machine with its handle 31' positioned for convenient use by the operator who stands on the platform P at the rear of the machine. This lever 31 is connected with the upper ends of the dogs 30 and 30' above their fulcrums by two rods 32 and 33 the inner ends of which are secured to the lever above and below its fulcrum respectively and extend transversely of the machine in opposite directions and project beyond the sides thereof. The outer ends of these rods 32 and 33 are connected with the dogs 30 by means of pivotally connected links or levers 34 and 35 fulcrumed intermediate of their ends on brackets 38 and 39 which project laterally from the sides of the scoop. These levers are connected by pins 36 and slots 37 with the dogs 30 and 30' which are fulcrumed on the sides of the scoop. The springs 30$^a$ which press the faces of the dogs 30 and 30' into engagement with the shutters serve to force the ends of the levers 34 and 35 connected with the dogs outward, and their connected ends inward toward the sides of the scoop, as is shown in Fig. 5, and said dogs remain in engagement with the shutters for holding them in closed position until the lever 31 is actuated to release them. When it is desired to open the shutters, the lever 31 is swung on its fulcrum, thereby drawing the rear ends of the levers 34 at opposite sides of the scoop toward each other and their ends connected with the levers 35 outward, thereby forcing the ends of the levers 35 which are connected with the dogs 30' inward toward the scoop, thus releasing the dogs 30 and 30' from their engagement with the shutters. After said lever 31 is released, the springs 30$^a$ between the upper ends of the dogs 30 and 30' and the scoop, force said ends outward and cause the levers 34 and 35 to assume the position shown in Figs. 4 and 5.

From the above description it will be obvious that when the machine is in operation for cutting, dragging and leveling roads, the flexible elements 15 and 16 serve to hold the shutters in adjusted position and the scooped up earth is allowed to escape when desired by elevating the front edges of the shutters which is accomplished by raising the scoop.

When it is desired to use the machine for ditching or for forming gutters the cutting blades and the shutters may be tilted to the proper angle for the purpose of cutting on one side and not on the other by raising the flexible elements 15 and 16 on one side and lowering them on the other.

We claim as our invention:

1. In a grading and excavating machine, the combination of a wheel supported frame, an excavating scoop mounted for vertical movement thereon, said scoop having a sectional bottom, the sections of which extend transversely of the scoop and are hingedly connected therewith at their front ends, means for raising and lowering the free rear ends of said sections, spring pressed dogs fulcrumed on said scoop and adapted to engage the free ends of said sections to hold them in closed position, a pair of levers fulcrumed intermediately of their ends on the sides of said scoop, the levers of each pair being pivotally connected at their inner ends and engaged at points beyond their fulcrums with the upper ends of the section locking dogs, and an actuating member connected with said levers for operating them to disengage the dogs from the bottom sections.

2. In a grading and excavating machine, the combination of a wheel supported frame, an excavating scoop mounted for vertical movement thereon, said scoop having a hinged bottom, means for raising and lowering the free edge of said bottom, spring pressed dogs fulcrumed on said scoop and adapted to engage the free edge of said bottom to hold it in closed position, a pair of levers fulcrumed intermediately of their ends on one side of said scoop, the levers of each pair being pivotally connected at their inner ends and engaged at points beyond their fulcrums with the upper ends of the bottom locking dogs, a rod connected at one end with the rear end of one of said levers, an actuating lever fulcrumed intermediately of its ends on the rear wall of said scoop, said rod being pivotally connected at its inner end to said lever on one side of its fulcrum, whereby on the turning of said lever the dog connected levers will be actuated to release said dogs against the tension of their springs.

3. In a grading and excavating machine, the combination of a wheel supported frame, a scoop mounted for vertical movement thereon, means for raising and lowering said scoop, said scoop having a sectional bottom, the sections being pivoted at their front edges for swinging movement, spring pressed dogs fulcrumed on the sides of said scoop for engaging the rear ends of said sections to hold them in closed position, a pair of levers disposed on each side of said scoop, brackets extending laterally from said scoop in longitudinally spaced relation, the levers of each pair being pivotally connected at their inner ends and each fulcrumed intermediate of its ends on one of said brackets, said levers being provided at points beyond the fulcrums thereof with longitudinally extending slots, pins extending through said slots and connecting said levers with the upper spring pressed ends of said dogs, rods connected at one end with the free rear ends of the rear levers of each pair, a lever fulcrumed intermediately of its ends on the rear of said scoop, said rods being pivotally connected with said lever on opposite sides of its fulcrum, whereby the connected levers are actuated to release the dogs.

In testimony whereof we have hereunto set our hands in presence of two subscribing witnesses.

ANDREW J. AKERS.
EMMETT E. AKERS.

Witnesses:
FRANK SONNET,
L. M. DEPENBROCK.